United States Patent [19]

Barone

[11] Patent Number: 5,314,276

[45] Date of Patent: May 24, 1994

[54] LADING SEPARATING AND BRACING MEANS

[76] Inventor: Joseph P. Barone, 1502 Erbs Mill Rd., Blue Bell, Pa. 19422

[21] Appl. No.: 96,711

[22] Filed: Jul. 23, 1993

Related U.S. Application Data

[63] Continuation of Ser. No. 924,596, Jul. 24, 1992, abandoned, which is a continuation of Ser. No. 610,810, Nov. 8, 1990, abandoned.

[51] Int. Cl.$^5$ .............................................. B60P 7/00
[52] U.S. Cl. .................................. 410/139; 220/552; 220/546; 410/141; 410/149
[58] Field of Search ................ 410/81, 121, 122, 127, 410/129, 130, 132, 137, 140, 141, 142, 143, 144, 145, 146, 147, 148, 151, 152, 153, 156; 220/529, 530, 531, 532, 533, 534, 535, 536, 537, 538, 539, 540, 541, 542, 543, 544, 545, 546, 547, 548, 549, 550, 551, 552, 553, 554

[56] References Cited

U.S. PATENT DOCUMENTS

| | | | |
|---|---|---|---|
| 2,077,649 | 4/1937 | Sweeley et al. | 410/156 X |
| 2,122,950 | 7/1938 | Reifer | 410/152 |
| 2,160,870 | 6/1939 | Jones | 410/137 |
| 2,214,042 | 10/1940 | Burdick | 220/553 |
| 2,467,681 | 4/1949 | McKinney | 410/152 |
| 2,468,101 | 4/1949 | Nampa | 410/150 |
| 2,543,175 | 2/1951 | Kilgore | 410/151 |
| 2,546,929 | 3/1951 | Nampa | 410/147 |
| 2,576,798 | 11/1951 | Mangels | 410/143 |
| 3,202,111 | 8/1965 | Chapman et al. | 410/147 |
| 3,352,595 | 11/1967 | Bezlaj | 410/139 |
| 3,367,287 | 2/1968 | Dunlop | 410/156 X |
| 3,490,388 | 1/1970 | Lundvall et al. | 410/139 |
| 3,554,136 | 1/1971 | Falk | 410/129 |
| 3,802,355 | 4/1974 | Hassellof | 410/132 |
| 4,074,634 | 2/1978 | Snow et al. | 410/152 |
| 4,236,854 | 12/1980 | Rogers | 410/129 |
| 4,699,270 | 10/1987 | Bohm | 220/532 |
| 4,737,056 | 4/1988 | Hunt | 410/151 |
| 4,743,151 | 5/1988 | Haberkorn | 410/121 |
| 4,772,165 | 9/1988 | Bartkus | 410/139 |
| 4,955,495 | 10/1990 | Ruebesam | 220/545 |
| 5,038,962 | 8/1991 | Ruebesam | 220/545 |

FOREIGN PATENT DOCUMENTS

| | | | |
|---|---|---|---|
| 522405 | 3/1956 | Canada | 410/145 |
| 763727 | 7/1967 | Canada | 410/133 |
| 763729 | 7/1967 | Canada | 410/133 |
| 563608 | 3/1957 | Italy | 410/143 |

*Primary Examiner*—Frank E. Werner
*Assistant Examiner*—James Eller
*Attorney, Agent, or Firm*—John Lezdey

[57] ABSTRACT

Space adjusting, lading separating, decking and bracing members for use in freight carrying vehicles. The members comprise the combination of apertured tracks which are placed on the walls, ceiling and floor, at least two apertured crossbars and at least one load bearing member that can be placed horizontally or vertically.

2 Claims, 4 Drawing Sheets

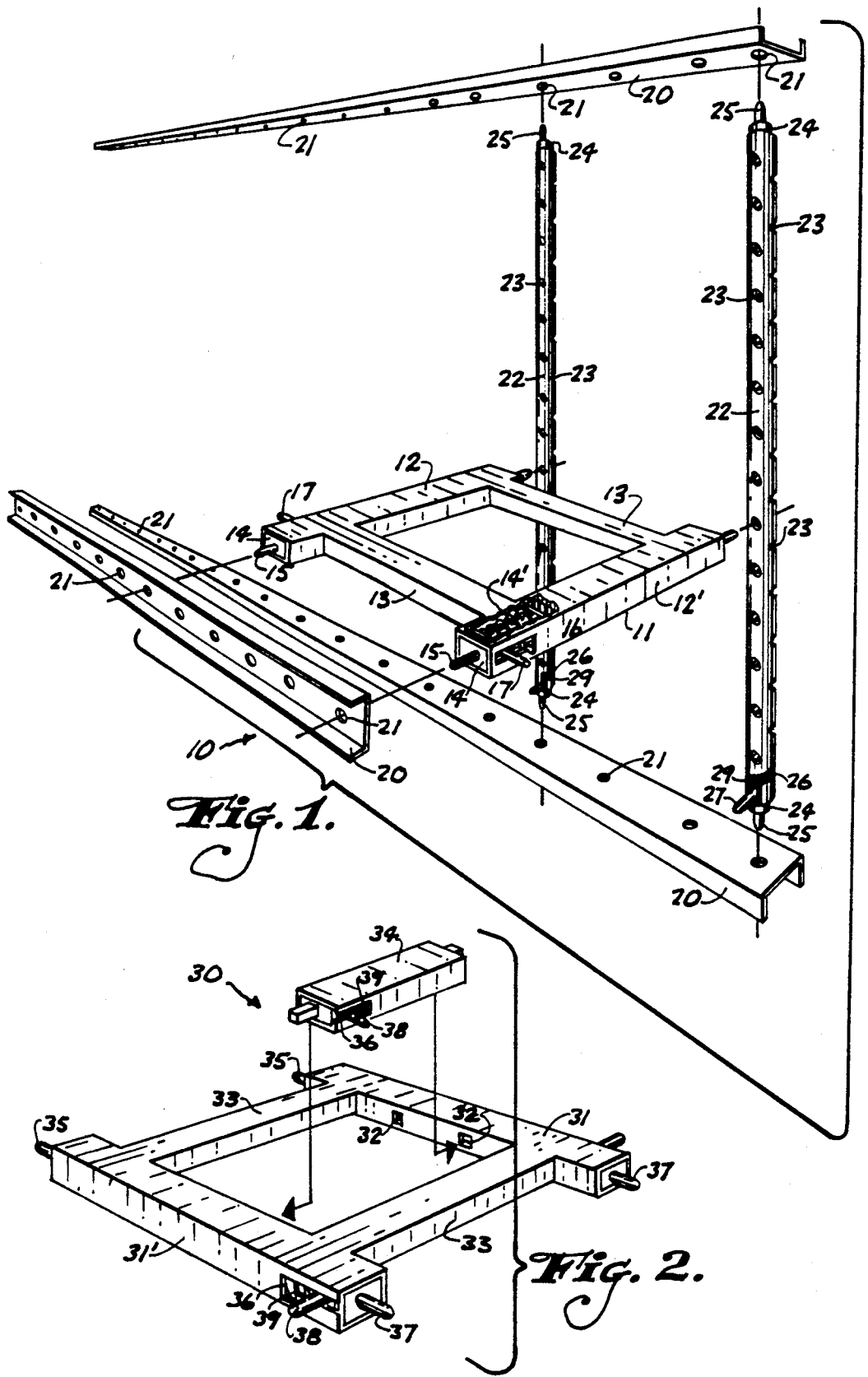

LADING SEPARATING AND BRACING MEANS

This is a continuation of application Ser. No. 07/924,596, filed Jul. 24, 1992, now abandoned, which is a continuation of application Ser. No. 07/610,810, filed Nov. 8, 1990, now abandoned.

FIELD OF THE INVENTION

This invention relates to new and useful improvements in freight loading and more particularly to parts and an arrangement of the parts whereby standard hauling vehicles can be readily and economically converted into a vehicle which can accommodate freight of assorted shapes and sizes.

BACKGROUND OF THE INVENTION

The hauling of freight of assorted shapes, sizes and weight has established the need for a shipper to simply and conveniently convert the interior of a standard freight hauling vehicle into a specialized design which will accommodate the various load capabilities of assorted freight to be shipped, without materially reducing the interior size and capacity of the vehicle.

In a typical railway car or truck van, a horizontal bed or floor is provided for supporting articles being transported. Articles are placed on this bed, and depending upon the size of the articles, they may be stacked upon each other at two or more levels. In some instances, however, stacking of the articles may be impractical due to the weight or configuration thereof in which case, substantial amounts of the vehicle interior may be unusable. As an example, where the articles or containers therefore, are of a somewhat fragile character, damage to the articles would occur if stacked to the extent that the weight of the upper articles would damage lower articles. In those instances, it is often necessary to avoid stacking or to minimize the amount of stacking. The end result is a loss of useable cubic footage.

Some articles are also somewhat difficult to handle or load due to the weight and/or configuration thereof, and this also creates problems for individuals loading other articles on a bed. For example, even if articles at a lower level will not be damaged from weight when other articles are stacked thereon, the stacking operation itself may be quite irregular and inefficient due to the configuration, size and weight of the articles. This incompatibility can cause the freight to move, twist, shift, fall or become lodged in between; thus causing damage.

Attempts have been made to alleviate some of these problems by incorporating intermediate decks in vehicles. In such vehicles, stacking problems can be avoided since the deck will support the weight of the upper articles, and the amount of manual lifting of articles can be minimized if workmen can move around on a deck level. Vehicles with permanent decks are, however, of limited versatility. One reason being, their adjustability is limited in many cases to one fixed height. Another reason being their inability to support efficiently half width sections of a freight vehicle when the size and shape of certain articles deem it necessary. Furthermore, the use of collapsible or removable intermediate decks has not met with any success due to inefficiencies in the design of the decks which make the decks either too expensive for practical purposes or too inconvenient to use.

It is desirable to provide a means for the utilization of cubic footage which results from shipping odd sized freight or fragile freight and also to prevent damage by shifting freight. It is further desirable that such means be capable of installation by a single person and readily disassembled as the freight which is hauled changes.

U.S. Pat. Nos. 2,468,101 and 2,467,681 disclose the use of tracks for side walls and cross bars for forming means for bracing and dividing the lading within a vehicle to reduce damage from shifting freight. However, the arrangements formed with the side tracks and cross bars are not sufficiently versatile to accommodate irregularly sized freight.

U.S. Pat. No. 2,160,870 discloses a partitioning means which extends completely across the vehicle forming a bulkhead. The partitioning means is not used as a load bearing member.

It is a general object of this invention to provide an improved vehicle construction whereby articles can be more efficiently supported for transportation purposes.

It is a further object of this invention to provide a vehicle construction of the type described which includes an intermediate deck arrangement adapted to provide maximum efficiency in the use of the construction.

It is a more particular object of this invention to provide an intermediate deck construction which is capable of providing the necessary support for articles loaded in a vehicle and which is at the same time of a highly efficient design whereby the deck can be economically installed in a vehicle and operated in a convenient fashion.

It is still a further object of the invention to provide a lading separating and loading means which can be easily assembled and disassembled and can be readily modified for use with different load shapes and sizes.

It is yet another object of the invention to provide a lading separating and loading means which can provide more usable space within a freight carrying vehicle.

It is also an object of the invention to provide lading separating means for dividing space horizontally in order to support freight vertically for the purpose of bracing freight.

SUMMARY OF THE INVENTION

According to the present invention there is provided lading separating and bracing means for use in the body of a freight carrying vehicle such as a truck, trailer, railroad car and the like. The lading separating and bracing means comprises the combination of apertured track means for mounting on the floor, ceiling and sidewalls of the vehicle, at least one apertured crossbar or post extending from the floor to the ceiling which is engagable with the track means, and a load bearing member or support frame comprising a pair of substantially parallel tubular members connected by at least two support arms. The tubular members have end members which are engagable within the apertures of the crossbar on one side and end members which are engagable with the sidewall track means on the other side to provide decking or bracing.

Advantageously, the crossbar and the tubular members are provided with at least one end member which is retractable or extensible.

Preferably, each end on each crossbar and tubular member comprises a hollow portion having a slidable member received therein and a spring disposed in said hollow portion normally urging the slidable member outward.

According to a further embodiment of the invention there is provided an auxillary apertured supporting member which is engagable within the track means and can either horizontally or vertically support one or more load bearing members.

These and other objects of this invention will appear hereinafter and for purposes of illustration, but not of limitation, specific embodiments of the invention are shown in the accompanying drawings in which:

BRIEF DESCRIPTION OF THE DRAWINGS

FIG. 1 is a perspective view of the parts for forming the deck means or freight separating means of the invention;

FIG. 2 is a perspective view of a further load bearing member of the invention;

DESCRIPTION OF THE PREFERRED EMBODIMENTS OF THE INVENTION

Figure 3:
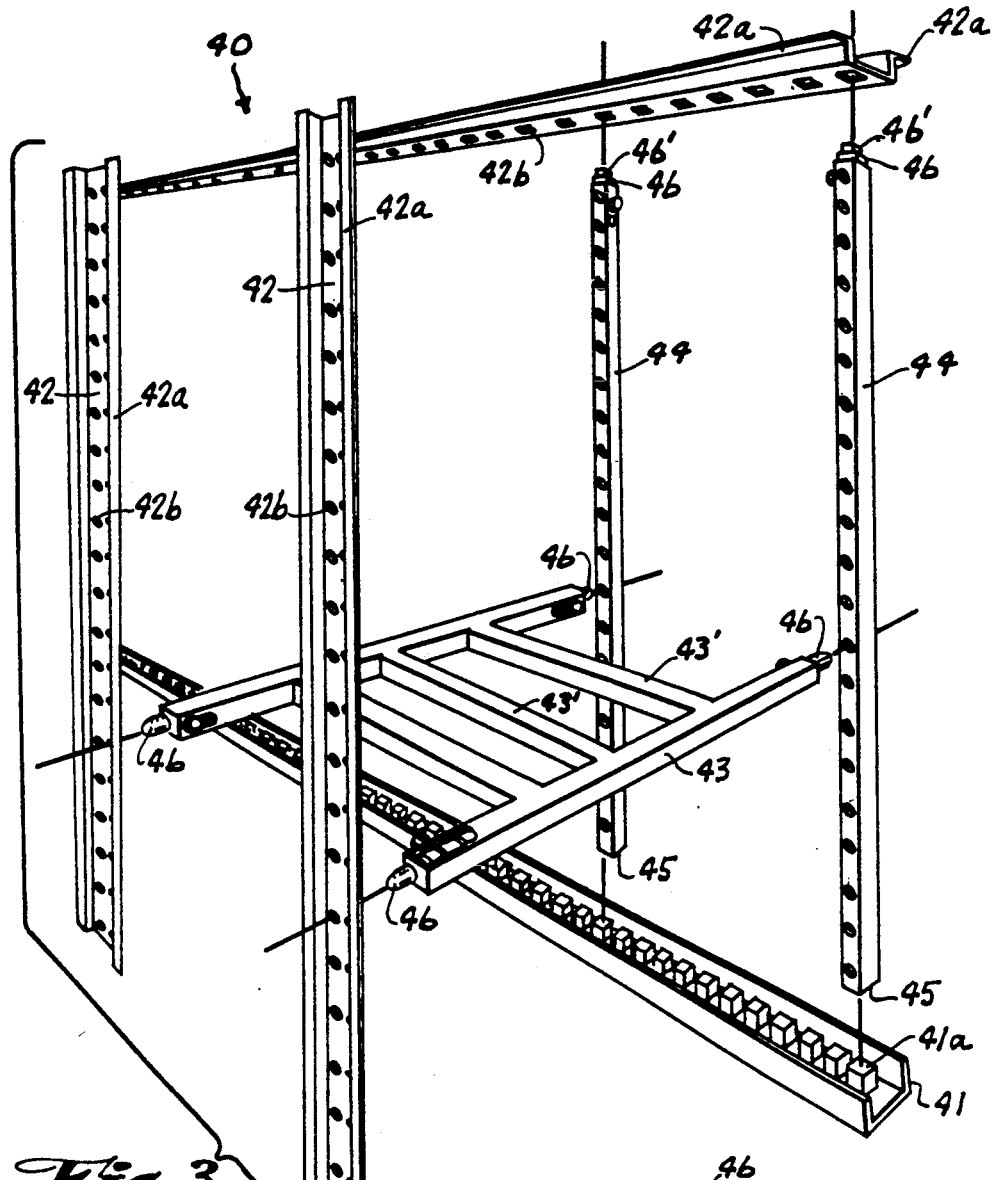
FIG. 3 is a perspective view of parts similar to that of FIG. 1 with different types of track and pole means.

Although specific terms are used in the following description for the sake of clarity, these terms are intended to refer only to the particular structure of the invention selected for illustration in the drawings, and are not intended to define or limit the scope of the invention.

As illustrated in FIG. 1 the lading separating and bracing means of the invention comprises a plurality of track means 20 having apertures 21. The track means 20 can be readily installed on the walls, ceiling and floor of freight carrying vehicles using bolts, screws, and the like. Crossbars 22 which extend from floor to ceiling or from side wall to side wall of the vehicle have end members 25 which fit into the apertures 21 of the track means 20. Although only illustrated at one end, all the end members 25 of the crossbars 25 are extensible and retractable. The end members are advantageously an integral part of the slide member 24 which sits in the end chamber 29 of the crossbars 22. The slide member 24 is normally urged outward by spring 26 and can be retracted using lever 27. However, only one end of the crossbar 22 needs to be extensible and retractable for functioning of the part. The crossbar 22 is provided with apertures 23 along its length which alternate in location so as to maintain a supporting strength in the crossbar 22.

A load bearing member 11 is provided which comprises a pair of substantially parallel tubular members 12, 12′ with support members 13. At the end portion of the tubular members 12, 12′ is provided a chamber 16 carrying a slidable member 14 which is urged forward by a spring 14′ and manually retractable with lever 17. The slidable member is found at all ends but is illustrated in the drawing only at one end. At the end of the slide member 14 is a projection 15 which fits into the apertures of the crossbars 22 and the track means 20. The load bearing member 11 can be used in the horizontal or vertical position and can, when the tracks 20 and crossbars 22 are properly arranged, form a gate or deck within the vehicle.

FIG. 2 shows a form of a load bearing member 30 comprising a pair of substantially parallel tubular members 31,31′ with fixed support members 33. At the end portion of the tubular members 31,31′ are chambers housing a slide member 36 which is urged forward by a spring 39 and is retractable by lever 38. At the end of the slide member 36 is a nub or protrusion 37 which fits into apertures 21 and 23. The other ends of the tubular members 31,31′ are protrusions 35 which also fit into apertures 21 and 23. The load bearing member 30 is further provided with removable support members 34 which can be placed in apertures 32 of the tubular members 31. The support members 34 are provided at one end with a chamber housing a slidable member 36 which is urged forward by a spring 39. A lever 38 on the slidable member 36 retracts the slidable member 36 so as to align the protrusions on the slidable member 36 with the apertures 32 of the tubular members 31. The removable support 34 can be utilized to support small boxes and the like.

FIG. 3 shows a modified lading separating and bracing means 40 wherein the track means 42 for the sidewalls and ceiling are provided with flanges 42a and apertures 42b. The floor track, 41 contains protrusions 41a with a configuration which matches the recess (not shown) of the end 45 of crossbar 44. At the other end of the crossbar 44 is a retractable member 46 with a protrusion 46′ having a configuration for association with the apertures and/or protrusions such as in the form of a square to prevent rotation of the part.

A load bearing member 43 with retractable end members 46 and a plurality of support members can be used in the construction to form a lading separating unit.

Figure 4:
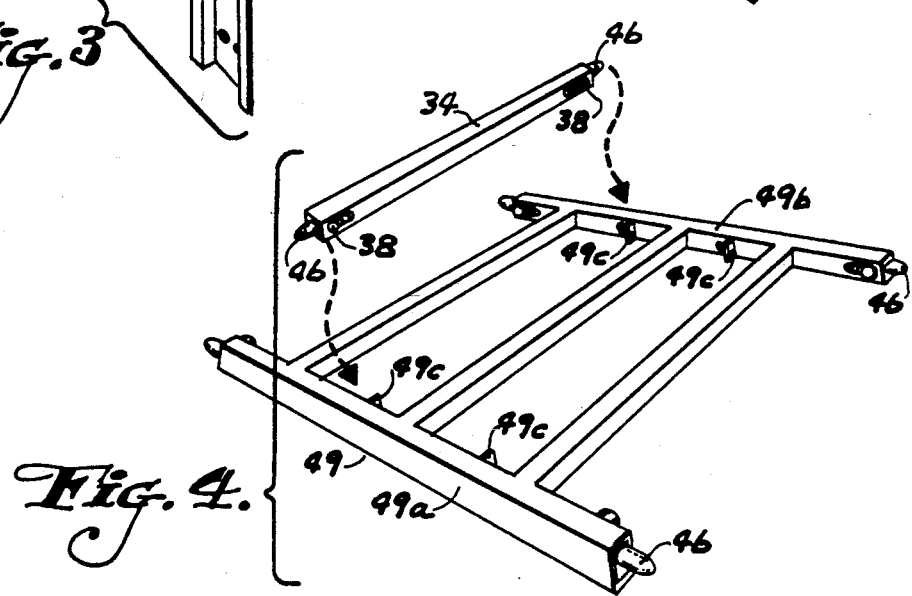
FIG. 4 is a perspective view of the load bearing member of FIG. 3.

FIG. 4 shows another form of load bearing member 49 that is similar to load bearing member 43 and which is provided with a removable support bar 34. The tubular members 49a, 49b of the load bearing member 49 are further provided with protrusions 49c for preventing rotation of the support 34.

Figures 5, 6:
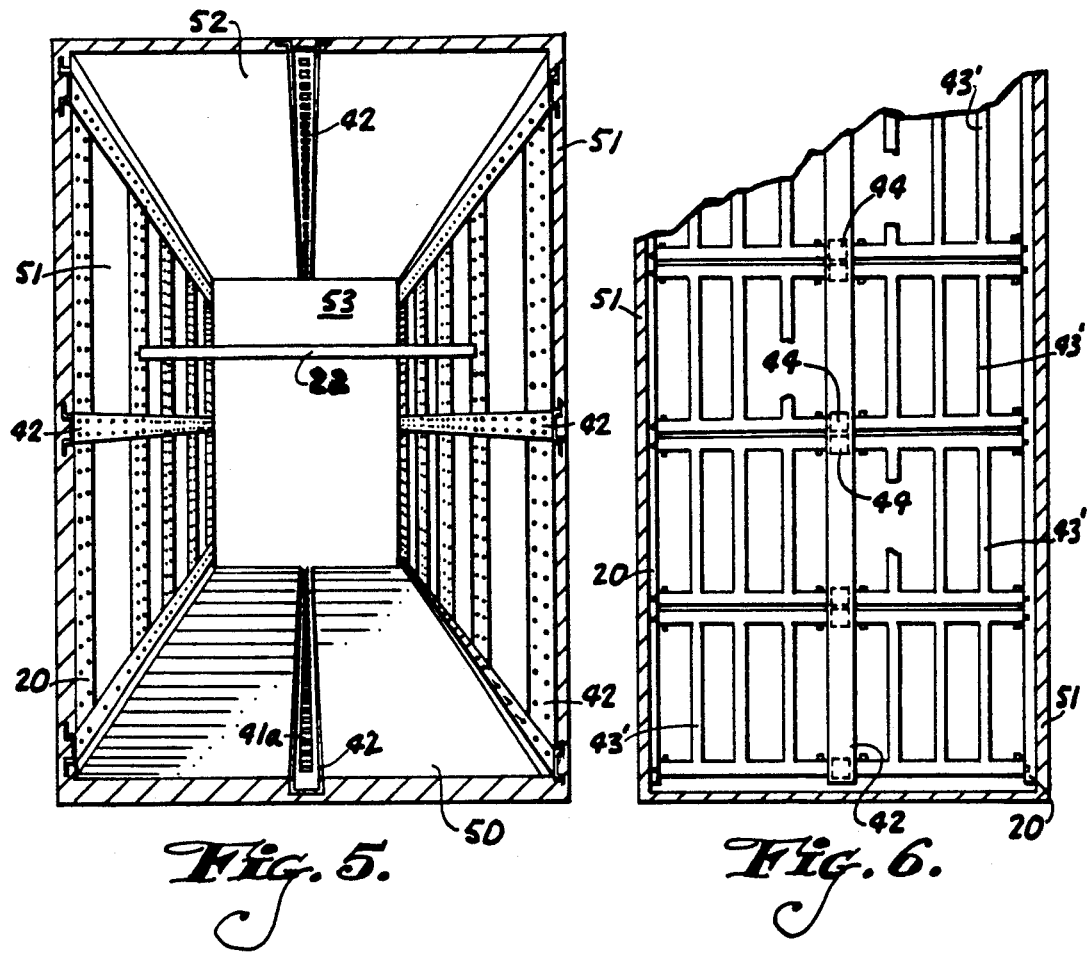
FIG. 5 shows the track means in place and a pole as a crossbar in a vehicle.
FIG. 6 is a sectional top view in part of the parts forming a support through a vehicle.

As illustrated in FIG. 5, the invention is applied to a conventional highway trailer having a generally rectangular body comprising a floor 50, sidewalls 51 and a roof 52. The body is closed at its forward end by an end wall 53 and may be provided at its open rear end with conventional closure doors. Although in many cases such doors may be omitted. It will be understood, of course, that any type of freight receiving body, such as a truck, railroad car or stationary storage space, could be equipped with the lading separating and end bracing means of the invention, as well as the trailer body illustrated.

Each of the side walls 51 is provided with tracks 42 which can be all horizontal, vertical or both as illustrated. The floor 50 can be provided a recess which contains a track 20 that is flush with the surface of the floor. The ceiling track 42 may also be recessed to be flush with the ceiling surface. A crossbar 22 can be provided across the trailer to act as a brace.

FIG. 6 illustrates one method of assembling the parts of the bracing means of the invention in the trailer shown in FIG. 5. The load bearing members 43 are placed in position so as to divide the trailer into two compartments. Crossbars 44 and the track means 42 support the load bearing members 43.

Figures 7, 8:
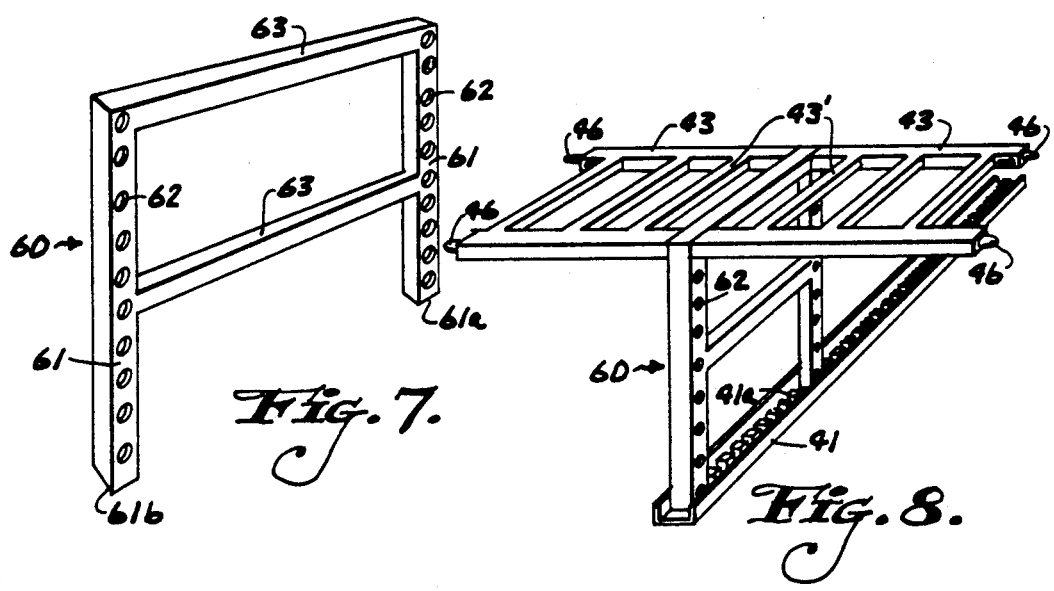
FIG. 7 is perspective view of an auxillary part used in the invention.
FIG. 8 is a perspective view of the part of FIG. 7 in combination with a load bearing member.

FIG. 7 illustrates an auxillary support 60 for use in connection with the parts of the invention. Support 60 comprises a pair of substantially parallel tubular members 61,61' having a multiplicity of apertures 62 of a size for association with the end protrusions of a load bearing support 43. The support 60 also has a plurality of crossbars 63 and at the end portions 61a, 61b a recess adapted to fit over the protrusions 41a of the floor track 41.

FIG. 8 illustrates the support 60 in use with load bearing members 43. The free ends of the load bearing members 43 can be engaged in a supporting relationship with crossbars 22 or tracks 42 along the sidewalls 51 depending on the length of the load bearing members 43.

Figure 9:
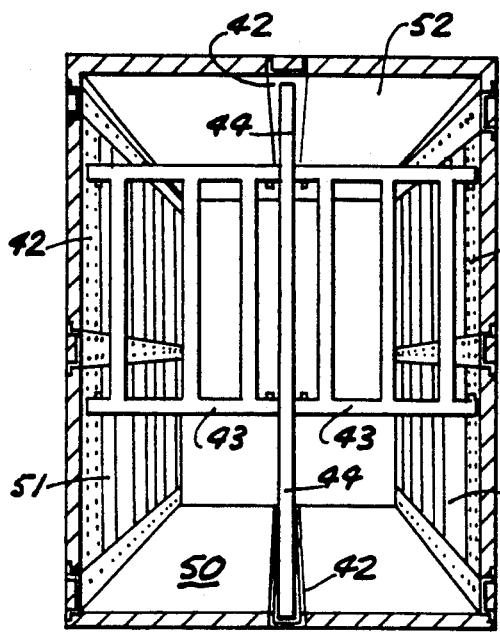
FIG. 9 is a perspective view illustrating the parts of the invention as used as a load locking system.

As illustrated in FIG. 9, a load-locking system can be provided at the front of the vehicle by providing a single crossbar 44 and placing a pair of load bearing members 43 in vertical association with vertical tracks means 42 and the crossbar 44.

Figure 10:
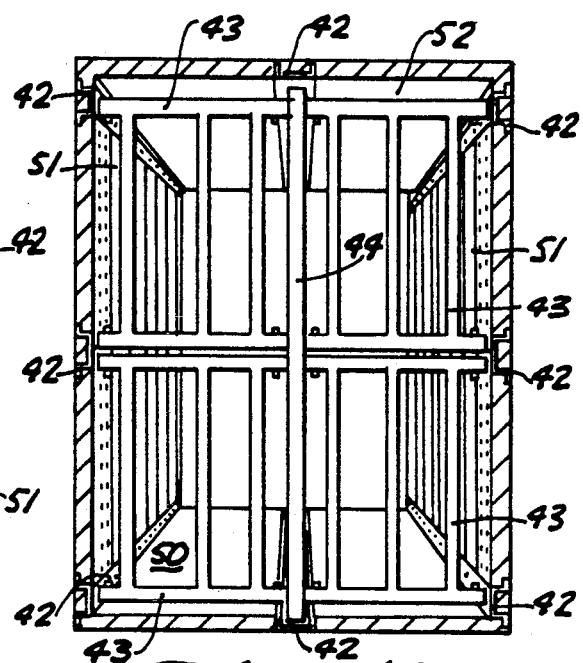
FIG. 10 is a perspective view of the parts of the invention assembled as a bulkhead system.

FIG. 10 shows the parts of the invention forming a bulk head system. A crossbar 44 is placed centrally in the front of the vehicle in the ceiling and floor tracks 42. Four load bearing members 43 are then positioned is association with the crossbar 44 and horizontal tracks 42 along the sidewalls.

Figure 11:
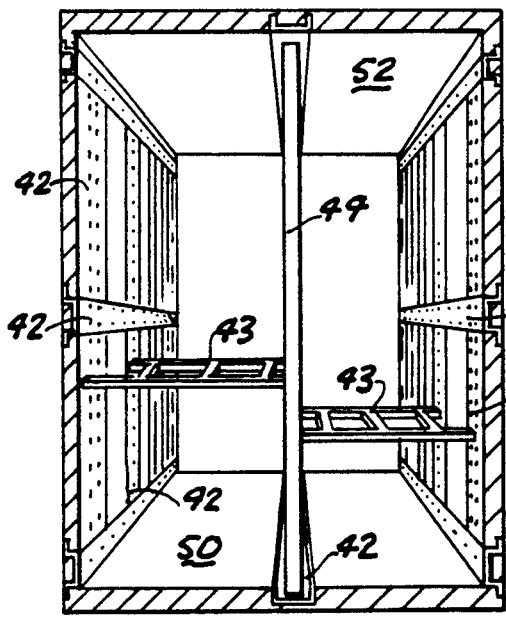
FIG. 11 is a perspective view of the parts of the invention assembled as a decking within a vehicle to receive freight.

FIG. 11 illustrates the parts of the invention in forming a decking system. The load bearing members 43 are placed as shown in a horizontal position in association with a pair of crossbars 44 and vertical tracks 42. The level can be adjusted depending upon the type of freight.

Figure 12:
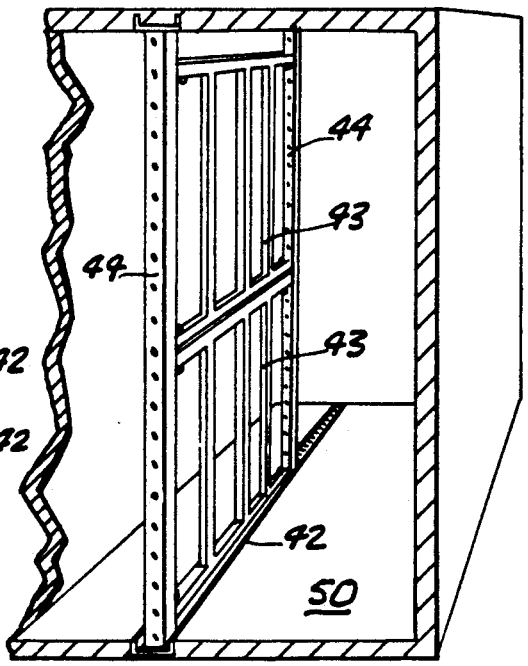
FIG. 12 is a perspective view illustrating the parts as used for an anti-load shifting system.

FIG. 12 illustrates the formation of an anti-load shifting system. Crossbars 44 are placed centrally in association with the track means and support load bearing members 43 which form a barrier.

As illustrated, the freight vehicle can be compartmentized in a wide variety of ways by arranging the components of the invention in a manner to accommodate the freight requirements.

The components are preferably metallic so as to stand up under heavy loads. Aluminum alloys are most advantageous since they are lightweight. However, the components can also comprise a combination of wood and metal parts.

What is claimed is:

1. In a freight carrying body having a floor disposed in a horizontal plane, two opposing vertical sidewalls, a front wall, and a ceiling parallel to the floor;
   at least one pair of longitudinally extending tracks, one track of said pair mounted on the ceiling, the other track mounted on the floor, said tracks being positioned equidistant from the sidewalls and having a series of aligned spaced apart apertures along their longitudinal axes;
   at least one pair of spaced apart vertical tracks mounted on one of said sidewalls and an opposing pair of spaced apart vertical tracks mounted on the other one of said sidewalls, each of said vertical tracks having a plurality of spaced apart apertures along the longitudinal length thereof in alignment with apertures in an opposing vertical track;
   a pair of spaced apart, vertical posts extending between said pair of longitudinally extending tracks, said posts having spaced apart apertures along their longitudinal axes and a locking means located o each end of each post respectively engaged with aligned apertures in said track on the ceiling and said track on the floor to secure said posts to said longitudinally extending tracks, at least one locking means on each of said posts being retractable to remove said posts form their vertical positions, the position of one of said posts being located between a first pair of opposing vertical tracks, the position of the other post being located between a second pair of opposing vertical tracks, each post having apertures in alignment with apertures in an associated pair of opposing vertical tracks;
   the improvement comprising a unitary support frame having a pair of substantially parallel spaced apart elongated members, spaced apart support arms extending between said members and being fixedly connected thereto, a detachable connecting means on each end of each of said members to secure said support frame to said posts and said vertical tracks on either one of said sidewalls when said unitary support frame is in a horizontal orientation, said connecting means on one end of said frame engaged with selected aperture sin a pair of said vertical tracks on either one of the sidewalls and said connecting means on the opposite end of said frame engaged with aligned apertures in said pair of vertical posts to provide an upper decking means to support articles of freight in an area extending from one of the sidewalls to the center of said body;
   or alternatively, said support frame in a first vertical orientation when positioned between said posts and having said connecting means on one end of said frame engaged with selected apertures in one of said vertical posts and having said connecting means on the opposite end of said frame engaged with aligned apertures in the other one of said vertical posts to provide a bracing means to retain articles of freight against the sidewalls of said body, said support frame being used in a second vertical orientation by having the connecting means on one end of said frame engaged with selected apertures in a selected vertical track on either one of the sidewalls and having the connecting means on the opposite end of said frame engaged with aligned apertures in one of said vertical posts which has apertures in alignment with apertures in said selected vertical track so as to provide a bracing means to retain articles of freight against the front wall of said freight carrying body.

2. Apparatus for supporting and bracing freight in a load carrying body, said body having a floor disposed in a horizontal plane, two opposing vertical sidewalls, a front wall and a ceiling parallel to the floor, said apparatus comprising in combination: at least one pair of longitudinally extending tracks, one track of said pair mounted on the ceiling, the other track mounted on the floor, said tracks being positioned equidistant from the sidewalls and having a series of aligned spaced apart apertures along their longitudinal axes;

at least one pair of spaced apart vertical tracks mounted on one of said sidewalls and an opposing pair of spaced apart vertical tracks mounted on the other one of said sidewalls, each of said vertical tracks having a plurality of spaced apart apertures along the longitudinal length thereof in alignment with aperatures in an opposing vertical track;

a pair of spaced apart vertical posts extending between said pair of longitudinally extending tracks, said posts having spaced apart apertures along their longitudinal axes and a locking means located on each end of each post respectively engaged with aligned apertures in said track on the ceiling and said track on the floor to secure said posts to said longitudinally extending tracks, at least one locking means on each of said posts being retractable to remove said posts from their vertical positions, the position of one of said posts being located between a first pair of opposing vertical tracks, the position of the other post being located between a second pair of opposing vertical tracks, each post having apertures in alignment with aperture sin an associated pair of opposing vertical tracks;

a unitary support frame comprising a pair of substantially parallel spaced apart elongated members, spaced apart support arms extending between said members and being fixedly connected thereto, a detachable connecting means on each end of each of said members to secure said support frame to said posts and said vertical tracks on either one of said sidewalls when said unitary support frame is in a horizontal orientation, said connecting means on one end of said frame engaged with selected apertures in a pair of said vertical tracks on either one of the sidewalls and said connecting means on the opposite end of said frame engaged with the aligned apertures in said pair of vertical posts to provide an upper decking means to support articles of freight in an area extending from one of the sidewalls to the center of said body;

or alternatively, said support frame in a first vertical orientation when positioned between said posts and having said connecting means on one end of said frame engaged with selected apertures in one of said vertical posts and having said connecting means on the opposite end of said frame engaged with aligned apertures in the other one of said vertical posts to provide a bracing means to retain articles of freight against the sidewalls of said body, said support frame being used in a second vertical orientation by having the connecting means on one end of said frame engaged with selected apertures in a selected vertical track on either one of the sidewalls and having the connecting means on the opposite end of said frame engaged with aligned apertures in one of said vertical posts which has apertures in alignment with apertures in said selected vertical track so as to provide a bracing means to retain articles of freight against the front wall of said load carrying body.

* * * * *